United States Patent
Yang et al.

(10) Patent No.: US 9,584,265 B2
(45) Date of Patent: Feb. 28, 2017

(54) METHOD AND APPARATUS FOR SENDING HYBRID AUTOMATIC REPEAT REQUEST ACKNOWLEDGE INFORMATION

(75) Inventors: Weiwei Yang, Shenzhen (CN); Bo Dai, Shenzhen (CN); Chunli Liang, Shenzhen (CN); Bin Yu, Shenzhen (CN); Shuqiang Xia, Shenzhen (CN)

(73) Assignee: ZTE CORPORATION (CN)

( * ) Notice: Subject to any disclaimer, the term of this patent is extended or adjusted under 35 U.S.C. 154(b) by 253 days.

(21) Appl. No.: 14/369,403

(22) PCT Filed: Mar. 9, 2012

(86) PCT No.: PCT/CN2012/072153
§ 371 (c)(1),
(2), (4) Date: Jun. 27, 2014

(87) PCT Pub. No.: WO2013/097347
PCT Pub. Date: Jul. 4, 2013

(65) Prior Publication Data
US 2014/0369290 A1   Dec. 18, 2014

(30) Foreign Application Priority Data

Dec. 31, 2011 (CN) .......................... 2011 1 0458299

(51) Int. Cl.
H04W 72/02 (2009.01)
H04W 72/04 (2009.01)
(Continued)

(52) U.S. Cl.
CPC .......... H04L 1/1861 (2013.01); H04L 1/0073 (2013.01); H04L 5/001 (2013.01);
(Continued)

(58) Field of Classification Search
CPC ....... H04L 1/0073; H04L 1/18; H04L 1/1861; H04L 1/1864; H04L 5/001; H04L 5/0055;
(Continued)

(56) References Cited

U.S. PATENT DOCUMENTS 9,014,063 B2 * 4/2015 Lee .................. H04L 1/1861 370/280
9,247,534 B2 * 1/2016 Han .................. H04W 72/0413
(Continued)

FOREIGN PATENT DOCUMENTS

CN 101989904 A 3/2011
CN 102 064 921 A 5/2011
(Continued)

OTHER PUBLICATIONS

Translation of foreign reference CN 102064921 A. (Published May 18, 2011). 15 pages.*
(Continued)

Primary Examiner — Ahmed Elallam
(74) Attorney, Agent, or Firm — McAndrews, Held & Malloy, Ltd.

(57) ABSTRACT

Provided are a method and apparatus for sending Hybrid Automatic Repeat Request Acknowledge (HARQ-ACK) information. The method includes: when a terminal employs a physical uplink control channel (PUCCH) format 3 to transmit HARQ-ACK information and the HARQ-ACK information is transmitted over a uplink physical shared channel (PUSCH), determining the number of downlink subframes for serving cells to feed back the HARQ-ACK information; determining the number of encoded modulated symbols required for sending the HARQ-ACK information according to the determined number of downlink subframes; and mapping the HARQ-ACK information to be sent to the PUSCH of a specified uplink subframe according to the
(Continued)

number of encoded modulated symbols and sending the HARQ-ACK information. The technical solutions provided by the disclosure are applied to improve the performance of the HARQ-ACK information, and thus improve the data performance.

20 Claims, 5 Drawing Sheets

(51) Int. Cl.
*H04L 1/18* (2006.01)
*H04L 5/00* (2006.01)
*H04L 1/00* (2006.01)
*H04L 5/14* (2006.01)

(52) U.S. Cl.
CPC .......... *H04L 5/0055* (2013.01); *H04W 72/02* (2013.01); *H04W 72/0413* (2013.01); *H04L 5/1469* (2013.01)

(58) Field of Classification Search
CPC .... H04L 5/0057; H04L 5/1469; H04W 72/02; H04W 72/04; H04W 72/0413
See application file for complete search history.

(56) References Cited

U.S. PATENT DOCUMENTS

| | | | | |
|---|---|---|---|---|
| 9,374,808 | B2* | 6/2016 | Yang | H04L 5/14 |
| 9,450,709 | B2* | 9/2016 | Papasakellariou | H04L 1/1614 |
| 2010/0272048 | A1* | 10/2010 | Pan | H04L 1/1635 |
| | | | | 370/329 |
| 2011/0134771 | A1* | 6/2011 | Chen | H04L 1/0027 |
| | | | | 370/252 |
| 2011/0242997 | A1* | 10/2011 | Yin | H04L 1/0031 |
| | | | | 370/252 |
| 2012/0113831 | A1* | 5/2012 | Pelletier | H04L 5/0058 |
| | | | | 370/252 |
| 2014/0321442 | A1* | 10/2014 | Kim | H04W 52/146 |
| | | | | 370/336 |

FOREIGN PATENT DOCUMENTS

| | | | |
|---|---|---|---|
| CN | 102064921 | A | 5/2011 |
| CN | 102141941 | A | 8/2011 |
| CN | 102170339 | A | 8/2011 |
| CN | 102208968 | A | 10/2011 |
| WO | 2011085230 | A2 | 7/2011 |

OTHER PUBLICATIONS

International Search Report corresponding to International Application No. PCT/CN/2012/072153, mailed Oct. 4, 2012.

Communication with Supplementary European Search Report dated Sep. 21, 2015 corresponding to European Patent Application No. EP 12863173.6.

"3rd Generation Partnership Project; Technical Specification Group Radio Access Network; Evolved Universal Terrestrial Radio Access (E-UTRA); Physical layer procedures (Release 10)", 3GPP Standard; 3GPP TS 36.213, 3rd Generation Partnership Project (3GPP), Mobile Competence Centre; 650, Route Des Lucioles ; F-06921 Sophia-Antipolis Cedex ; France, vol. RAN WG1, No. V10.4.0, Dec. 15, 2011 (Dec. 15, 2011).

* cited by examiner

METHOD AND APPARATUS FOR SENDING HYBRID AUTOMATIC REPEAT REQUEST ACKNOWLEDGE INFORMATION

TECHNICAL FIELD

The disclosure relates to the field of communications, and in particular to a method and apparatus for sending Hybrid Automatic Repeat Request Acknowledge (HARQ-ACK) information.

BACKGROUND

A radio frame in a Long Term Evolution (LTE) system includes a frame structure of a Frequency Division Duplex (FDD) mode and a frame structure of a Time Division Duplex (TDD) mode. As shown in FIG. 1, in the frame structure of the FDD mode, one radio frame of 10 ms is composed of twenty slots with the length of 0.5 ms and serial numbers of 0-19, and slots 2i and 2i+1 make up a subframe i with the length of 1 ms (wherein, 0≤i≤9). As shown in FIG. 2, in the frame structure of the TDD mode, one radio frame of 10 ms is composed of two half frames with the length of 5 ms, wherein one half frame includes 5 subframes with the length of 1 ms, and subframe i is defined as the combination of two slots 2i and 2i+1 with the length of 0.5 ms (wherein, 0≤i≤9). The uplink and downlink configurations supported by each subframe are as shown in Table 1, wherein "D" represents subframes dedicated to downlink transmission, "U" represents subframes dedicated to uplink transmission, "S" represents special subframes used in the three domains of Downlink Pilot Time Slot (DwPTS), Guard Period (GP) and Uplink Pilot Time Slot (UpPTS).

TABLE 1

Schematic table of uplink and downlink configurations supported by each subframe

| Uplink-Downlink configuration | Period of downlink-uplink switch point | Subframe number # | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

It can be seen from the above table that the Long Term Evolution (LTE) TDD supports uplink and downlink switch periods of 5 ms and 10 ms. If the period of downlink-to-uplink switch point is 5 ms, then special subframes would exist in two half frames; and if the period of downlink-to-uplink switch point is 10 ms, then special subframes would only exist in the first half frame; the subframe #0 and the subframe #5 and the DwPTS are always used for downlink transmission; and the UpPTS and subframes following the special subframes are dedicated to uplink transmission.

In the LTE TDD system, since the uplink and downlink subframes are not in one-to-one correspondence, that is, the HARQ-ACK information of a plurality of downlink subframes needs to be sent in the Physical Uplink Control Channel (PUCCH)/Physical uplink shared channel (PUSCH) of one uplink subframe, wherein the set of downlink subframes associated with the uplink subframe makes up a bundling window. Two methods of sending the HARQ-ACK information are defined: one is a HARQ-ACK bundling method, and the other is a HARQ-ACK multiplexing method. Whether UE (User Equipment) employs the method of bundling or multiplexing to feed back the HARQ-ACK information is configured by the high-layer. The basic principle of the bundling method is to carry out a logical AND operation (time domain bundling) on the HARQ-ACK information of the code word streams corresponding to respective downlink subframes needing to be fed back in the uplink subframe, to obtain the HARQ-ACK information of ½ bit. When a UE has no PUSCH to send in a current subframe, the UE would employ a format of 1a/1b to send the ½ bit HARQ-ACK information in the PUCCH; and when the UE has PUSCH to send in a current frame, the UE sends the ½ bit acknowledge information in the PUSCH after performing certain channel encoding and channel interleaving on the ½ bit acknowledge information. The core principle of the multiplexing method is to utilize different PUCCH channels and different modulated symbols on each channel to represent different feedback states of the downlink subframes that need to be fed back in the uplink subframe, and if there are a plurality of transport blocks on the downlink subframes, then firstly spatial logic AND (also referred to as spatial domain bundling) is carried out on the HARQ-ACK information fed back by the plurality of transport blocks of the downlink subframes, then channel selection is performed, and then the PUCCH format 1b is used to send the HARQ-ACK information. When the UE has no PUSCH to send in a current subframe, the UE would employ the format 1b with channel selection to send the plurality of pieces of HARQ-ACK information on the PUCCH; and when the UE has PUSCH to send in a current subframe, then the UE multiplexes a plurality of pieces of bit acknowledge information with data after certain mapping from HARQ-ACK states to corresponding bits, channel encoding, channel interleaving are performed to the bit acknowledge information, and then sends them on the PUSCH.

The encoding process when the HARQ-ACK information is transmitted on the PUSCH includes: firstly calculating the number $Q'_{ACK}$ of the symbols needed to be encoded according to the formula $$Q'_{ACK} = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right);$$

wherein O represents the number of bits of the uplink control information to be sent; $M_{sc}^{PUSCH}$ represents the bandwidth for PUSCH transmission in a current subframe, and this value is expressed as the number of carriers; $N_{symb}^{PUSCH-initial}$ represents the number of symbols except for those used for the Demodulation Reference Signal (DMRS) and the Sounding Reference Signal (SRS) in the initial PUSCH transmission; $M_{SC}^{PUSCH-initial}$ represents the bandwidth in the initial PUSCH transmission, and this value is expressed as the number of carriers; C represents the corresponding number of code blocks after the transport blocks are subjected to CRC and code block division; $K_r$ represents the number of bits corresponding to each code block of the transport block; for an identical transport block, C, $K_r$ and $M_{SC}^{PUSCH-initial}$ are obtained from an initial PDCCH; when there is no initial PDCCH with DCI format 0, $M_{SC}^{PUSCH-initial}$ C and $K_r$ could be obtained in the following two ways: (1) when the initial PUSCH employs semi-static scheduling, they could be obtained from the PDCCH configured by the latest semi-static scheduling; (2) when the PUSCH is triggered by a random access response authorization, they are obtained from the random access response authorization corresponding to the same transport block. $\beta_{offset}^{PUSCH}$ represents $\beta_{offset}^{HARQ-ACK}$ or $\beta_{offset}^{RI}$, the value is configured by the high-layer. Afterwards, channel encoding is carried out on the HARQ-ACK information, and the bits of the encoded HARQ-ACK information are repeated, until a target length $Q_{ACK}=Q'_{ACK} \cdot Q_m$ is satisfied. The bits of the encoded information are respectively recorded as $[q_0^{ACK}, q_1^{ACK}, q_2^{ACK}, \ldots, q_{Q_{ACK}-1}^{ACK}]$, a corresponding encoding modulation sequence $[\underline{q}_0^{ACK}, \underline{q}_1^{ACK}, \underline{q}_2^{ACK}, \ldots, \underline{q}_{Q'_{ACK}-1}^{ACK}]$ is generated according to a modulation order, and $[\underline{q}_0^{ACK}, \underline{q}_1^{ACK}, \underline{q}_2^{ACK}, \ldots, \underline{q}_{Q'_{ACK}-1}^{ACK}]$ and encoded data and/or other encoded uplink control information are transmitted after channel interleaving.

In order to satisfy the requirements of the International Telecommunication Union-Advanced (ITU-Advanced), the Long Term Evolution Advanced (LTE-A) system, as the LTE evolution standard, needs to support a greater system bandwidth (up to 100 MHz), and needs to be backward compatible with the existing standards of the LTE. On the basis of an existing LTE system, a greater bandwidth could be obtained by combining the bandwidths of the LTE system, and such a technique is called a Carrier Aggregation (CA) technique. The technique could improve the spectrum efficiency of an IMT-Advance system, relieve the shortage of spectrum resources, and thus optimizing the utilization of spectrum resources. The bandwidth of the LTE system using the carrier aggregation could be regarded as a Component Carrier (CC), each Component Carrier could also be called a cell, that is, a spectrum could be aggregated by n Component Carriers (n cells). The resources of a R10 terminal (User Equipment, UE) are composed of n cells/Component Carriers in the frequency domain, wherein one cell is called a Primary cell (Pcell), and the rest cells are called Secondary cells (Scells). For the TDD, the uplink and downlink configurations of the aggregated serving cells are the same.

In the LTE-A TDD, when the HARQ-ACK information is sent on the PUCCH, two sending ways are defined: the PUCCH format 1b with channel selection and the PUCCH format3.

It is also defined in the LTE-A that, when uplink and downlink configurations 1-6 are employed and the number of configured serving cells is greater than 1, or when the TDD uplink and downlink configurations 1-6 are employed, the number of the configured serving cells is equal to 1 and the configuration employs the PUCCH format3, the DAI value in the DCI format 0/4 is $W_{DAI}^{UL}$, and the specific value is as shown in Table 2. If there is no PUSCH transmitted, or, there is no PDCCH indicating downlink release and there is transmission of corresponding DCI format 0/4, $W_{DAI}^{UL}=4$.

TABLE 2

Corresponding $W_{DAI}^{UL}$ values of DAI in the DCI format 0/4

| DAI<br>High bit, low bit | $W_{DAI}^{UL}$ |
| --- | --- |
| 0, 0 | 1 |
| 0, 1 | 2 |
| 1, 0 | 3 |
| 1, 1 | 4 |

When the HARQ-ACK information is transmitted over the PUSCH and it is configured to employ the PUCCH format3 to transmit the fed back HARQ-ACK information, for TDD uplink and downlink configuration 0 or PUSCH transmission not performed according to the DCI format 0/4, $B_c^{DL}=M$, wherein $B_c^{DL}$ is the number of downlink subframes for which the UE needs to feed back the HARQ-ACK for the serving cell c, and M is the number of downlink subframes in a bundling window; for the TDD uplink and downlink configurations {1, 2, 3, 4, 6} and PUSCH transmission performed according to the DCI format 0/4, $B_c^{DL}=W_{DAI}^{UL}$; and for the TDD uplink and downlink configuration 5 and PUSCH transmission performed according to the DCI format 0/4, $B_c^{DL}=W_{DAI}^{UL}+4\lfloor(U-W_{DAI}^{UL})/4\rfloor$, wherein U represents the maximum $U_c$ of all serving cells, $U_c$ refers to the accumulative number of the PDCCH indicating the SPS release and the PDSCH received on the serving cell c, and if the UE does not receive the PDSCH or the PDCCH indicating downlink SPS release and $W_{DAI}^{UL}=4$, the UE would not transmit the HARQ-ACK on the PUSCH.

In the subsequent version, when carrier aggregation is supported, the uplink and downlink configurations of aggregated serving cells could be different, that is to say, the numbers of downlink subframes for which the HARQ-ACK information needs to be fed back for respective serving cells are different, in which case, if the existing solution of transmitting HARQ-ACK information on the PUSCH is still employed, transmission of some invalid HARQ-ACK information would be caused. As shown in FIG. 3, assuming $W_{DAI}^{UL}=4$, the HARQ-ACK information transmitted over the PUSCH according to the existing HARQ-ACK information transmission solution is 8 bits, but the HARQ-ACK information that actually needs to be fed back is only 5 bits, and 3 bits of invalid HARQ-ACK information are transmitted to a base station, thus affecting the performance of HARQ-ACK information and data.

SUMMARY

The disclosure provides a method and apparatus for sending Hybrid Automatic Repeat Request-Acknowledge information, so as to at least solve the problem in the related techniques that when uplink and downlink configurations of aggregated serving cells are different, the performance of HARQ-ACK information and data gets worse when HARQ-ACKs are transmitted over a PUSCH.

According to an aspect of the disclosure, a method for sending Hybrid Automatic Repeat Request-Acknowledge information is provided, the method including: when a terminal is configured to employ a Physical Uplink Control Channel (PUCCH) format 3 to transmit HARQ-ACK information and the HARQ-ACK information is transmitted over a Physical Uplink Shared Channel (PUSCH), the terminal determining the number of downlink subframes for serving cells to feed back the HARQ-ACK information; the terminal determining the number of encoded modulated symbols required for sending the HARQ-ACK information according to the determined number of the downlink subframes; and the terminal mapping the HARQ-ACK information to be sent to the PUSCH of a specified uplink subframe according to the number of the encoded modulated symbols, and sending the HARQ-ACK information.

The terminal determining the number of downlink subframes for the serving cells to feed back the HARQ-ACK information includes: when PUSCH transmission is based on a DCI format 0/4, the terminal determining the number of the downlink subframes according to uplink and downlink configurations of the serving cells and DAI signaling in the DCI format 0/4.

The terminal determining the number of the downlink subframes according to the uplink and downlink configurations of the serving cells and the DAI signaling in the DCI format 0/4 includes: if the uplink and downlink configurations of the serving cells are {1, 2, 3, 4, 6}, then obtaining the number of the downlink subframes by calculating according to the following formula: $B_c^{DL}=\min(W_{DAI}^{UL}, M_c)$, wherein $B_c^{DL}$ is the number of the downlink subframes, min represents taking a minimum value, $M_c$ is the number of downlink subframes within a bundling window corresponding to the specified uplink subframe, and $W_{DAI}^{UL}$ is the value of the DAI signaling in the DCI format 0/4.

The terminal determining the number of the downlink subframes according to the uplink and downlink configurations of the serving cells and the DAI signaling in the DCI format 0/4 includes: if the uplink and downlink configurations of the serving cells are {5}, then obtaining the number of the downlink subframes by calculating according to the following formula: $B_c^{DL}=\min(W_{DAI}^{UL}+4\lfloor(U-W_{DAI}^{UL})/4\rfloor, M_c)$, wherein $B_c^{DL}$ is the number of the downlink subframes, min represents taking a minimum value, $M_c$ is the number of downlink subframes within a bundling window corresponding to the specified uplink subframe, U is a maximum value of $U_c$ of all serving cells, $U_c$ is an accumulative number of PDCCH indicating SPS release and PDSCH received by the terminal in a bundling window, and $W_{DAI}^{UL}$ is the value of the DAI signaling in the DCI format 0/4.

The method further includes: if the terminal does not receive any PDSCH or any PDCCH indicating downlink SPS release in the bundling window of all serving cells and $W_{DAI}^{UL}=4$, then not sending the HARQ-ACK information on the PUSCH.

The terminal determining the number of downlink subframes for the serving cells to feed back the HARQ-ACK information includes: when PUSCH transmission is not based on signaling of a DCI format 0/4, the terminal determining the number of the downlink subframes according to uplink and downlink configurations of the serving cells.

The number of the downlink subframes is obtained by calculating according to the following formula: $B_c^{DL}=M_c$ wherein $B_c^{DL}$ represents the number of the downlink subframes, and $M_c$ is the number of downlink subframes within a bundling window corresponding to the specified uplink subframe.

The method further includes: if the terminal does not receive any PDSCH or any PDCCH indicating downlink SPS release in the bundling window of all serving cells, then not sending the HARQ-ACK information on the PUSCH.

The terminal determining the number of the encoded modulated symbols required for sending the HARQ-ACK information according to the determined number of the downlink subframes includes: the terminal determining a bit sequence of the HARQ-ACK information to be sent according to the number of the downlink subframes; and the terminal determining the number of the encoded modulated symbols required for sending the HARQ-ACK information according to the determined bit sequence.

The terminal determining the bit sequence of the HARQ-ACK information to be sent according to the number of the downlink subframes includes: the terminal determining the number of bits of the HARQ-ACK information to be sent; and the terminal mapping the HARQ-ACK information to be sent to the bit sequence according to the number of bits.

The number of bits is obtained by calculating according to the following formula:

$$N = \sum_{c=0}^{N_{cells}^{DL}-1} (B_c^{DL} \cdot k_c),$$

wherein N represents the number of bits, $N_{cells}^{DL}$ represents the number of configured serving cells, $B_c^{DL}$ represents the number of downlink subframes for the serving cells to feed back the HARQ-ACK information, and k represents the maximum of the number of transport blocks supported by a PDSCH corresponding to downlink transmission of the serving cells.

The terminal mapping the HARQ-ACK information to be sent to the bit sequence according to the number of bits includes: if the number of bits is no greater than 20, then the terminal mapping the HARQ-ACK information to the bit sequence according to an order of code words first, downlink subframes next and then the serving cells.

The terminal mapping the HARQ-ACK information to be sent to the bit sequence according to the number of bits includes: if the number of bits is greater than 20, then the terminal carrying out spatial domain bundling on the HARQ-ACK information and mapping the HARQ-ACK information to the bit sequence according to an order of the downlink subframes first and then the serving cells.

The terminal mapping the HARQ-ACK information to be sent to the bit sequence according to the number of bits includes: the terminal carrying out spatial domain bundling on the HARQ-ACK information of the serving cells according to a priority of the serving cells, and mapping the HARQ-ACK information to the bit sequence according to an order of code words first, the downlink subframes next, and then the serving cells.

The terminal carrying out the spatial domain bundling on the HARQ-ACK information of the serving cells according to the priority of the serving cells includes: the terminal determining the priority of the serving cells according to the corresponding number of the HARQ-ACK information of the uplink and downlink configurations of each of the serving cells; and the terminal carrying out the spatial domain bundling on the serving cells one by one according to the priority of the serving cells.

The terminal carrying out the spatial domain bundling on the HARQ-ACK information of the serving cells according to the priority of the serving cells includes: the terminal determining the priority of the serving cells according to the corresponding number of the HARQ-ACK information of the uplink and downlink configurations of each of the serving cells; and the terminal carrying out the spatial domain bundling on the PDSCHs one by one according to the priority of the serving cells.

According to another aspect of the disclosure, an apparatus for sending Hybrid Automatic Repeat Request-Acknowledge (HARQ-ACK) information is provided, and the apparatus is located in a terminal, the apparatus including: a first determination module, configured to, when a terminal is configured to employ a Physical Uplink Control Channel (PUCCH) format 3 to transmit HARQ-ACK information and the HARQ-ACK information is transmitted over a Physical Uplink Shared Channel (PUSCH), determine the number of downlink subframes for serving cells to feed back the HARQ-ACK information; a second determination module, configured to determine the number of encoded modulated symbols required for sending the HARQ-ACK information according to the determined number of the downlink subframes; and a sending module, configured to map the HARQ-ACK information to be sent to the PUSCH of a specified uplink subframe according to the number of the encoded modulated symbols, and send the HARQ-ACK information.

The first determination module is further configured to, when PUSCH transmission is based on a DCI format 0/4, determine the number of the downlink subframes according to uplink and downlink configurations of the serving cells and DAI signaling in the DCI format 0/4.

The first determination module is further configured to, when PUSCH transmission is not based on a DCI format 0/4, determine the number of the downlink subframes according to uplink and downlink configurations of the serving cells.

The second determination module includes: a first determination unit, configured to determine a bit sequence of the HARQ-ACK information according to the number of the downlink subframes; and a second determination unit, configured to determine the number of the encoded modulated symbols required for sending the HARQ-ACK information according to the determined bit sequence.

In the disclosure, a terminal determines the number of downlink subframes for serving cells to feed back the HARQ-ACK information, and determines the number of encoded modulated symbols required for sending the HARQ-ACK information according to the determined number of the downlink subframes, and then maps the HARQ-ACK information to the PUSCH of a subframe according to the determined number of encoded modulated symbols required for sending the HARQ-ACK information and sends the HARQ-ACK information. The solution solves the problem in the related techniques that when uplink and downlink configurations of aggregated serving cells are different, the performance of HARQ-ACK information and data is poor when HARQ-ACKs are transmitted over a PUSCH, avoids sending invalid HARQ-ACK information when the uplink and downlink configurations are different, thus increases the efficiency of sending HARQ-ACK information, improves the performance of HARQ-ACK information, and when the HARQ-ACK information and encoded data are transmitted after being channel interleaved, improves the performance of the data by increasing the efficiency of sending the HARQ-ACK information.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE EMBODIMENTS

The disclosure is described below with reference to the accompanying drawings and embodiments in detail. Note that, the embodiments of the disclosure and the features of the embodiments can be combined with each other if there is no conflict.

In each of the following embodiments, communication could be achieved by wireless connection or wired connection or a combination thereof, and is not limited by the disclosure.

Embodiment 1

Figure 4:
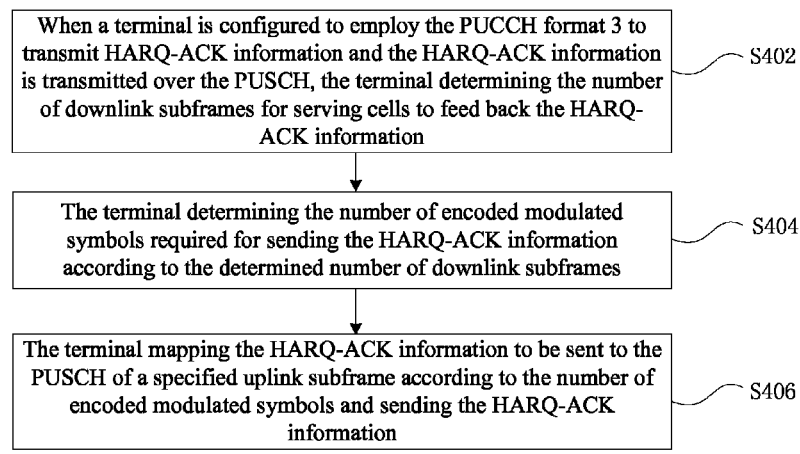
FIG. 4 is a flow diagram of a method for sending HARQ-ACK information according to an embodiment of the disclosure.

FIG. 4 is a flow diagram of a method for sending HARQ-ACK information according to an embodiment of the disclosure, and as shown in FIG. 4, the method for sending HARQ-ACK information includes:

S402: when a terminal is configured to employ a PUCCH format 3 to transmit HARQ-ACK information and the HARQ-ACK information is transmitted over a PUSCH, the terminal determines the number of downlink subframes for serving cells to feed back the HARQ-ACK information;

S404: the terminal determines the number of encoded modulated symbols required for sending the HARQ-ACK information according to the determined number of downlink subframes;

S406: the terminal maps the HARQ-ACK information to be sent to the PUSCH of a specified uplink subframe according to the number of encoded modulated symbols and sends the HARQ-ACK information.

Whether or not the terminal is configured to employ a PUCCH format 3 to transmit HARQ-ACK information and the HARQ-ACK information is transmitted over the PUSCH, the above processing steps could all be employed to send the HARQ-ACK information, achieving sending of the HARQ-ACK information according to the number of downlink subframes, avoiding sending invalid HARQ-ACK information when the uplink and downlink configurations are different, and thus solving the problem that the existing HARQ-ACK information transmission method would transmit invalid HARQ-ACK information when the uplink and downlink configurations of serving cells are different, increasing the efficiency of sending HARQ-ACK information, improving the performance of HARQ-ACK information, and when the HARQ-ACK information and encoded data are transmitted after being channel interleaved, improving the performance of the data by increasing the efficiency of sending HARQ-ACK information.

There are various methods for determining the number of downlink subframes, for example, the number of downlink subframes can be pre-agreed or obtained from the outside, and in a preferred implementation of the disclosure, when transmission of the PUSCH is based on the DCI format 0/4, the number of the downlink subframes could be determined according to the following way: the terminal determines the number of downlink subframes according to the uplink and downlink configurations of serving cells and the DAI signaling in the DCI format 0/4.

As mentioned above, the number of downlink subframes could be determined according to the uplink and downlink configurations of the serving cells and the DAI signaling in the DCI format 0/4: when the uplink and downlink configurations of the serving cells are {1, 2, 3, 4, 6}, the number of downlink subframes could, but not limited to, be obtained by calculating according to the following formula: $B_c^{DL}=\min(W_{DAI}^{UL}, M_c)$, wherein $B_c^{DL}$ is the number of downlink subframes, min represents taking a minimum value, $M_c$ is the number of downlink subframes in a bundling window corresponding to a specified uplink subframe, and $W_{DAI}^{UL}$ is the value of the DAI signaling in the DCI format 0/4.

As mentioned above, the number of downlink subframes could be determined according to the uplink and downlink configurations of the serving cells and the DAI signaling in the DCI format 0/4: when the uplink and downlink configurations of the serving cells are {5}, the number of downlink subframes could, but not limited to, be obtained by calculating according to the following formula: $B_c^{DL}=\min(W_{DAI}^{UL}+4\lfloor(U-W_{DAI}^{UL})/4\rfloor, M_c)$, wherein $B_c^{DL}$ is the number of downlink subframes, min represents taking a minimum value, $M_c$ is the number of downlink subframes in a bundling window corresponding to a specified uplink subframe, U is the maximum value of the $U_c$ of all serving cells, $U_c$ is the accumulative number of the PDCCH indicating SPS release and the PDSCH received by a terminal in the bundling window (here, in the bundling window of a single serving cell), and $W_{DAI}^{UL}$ is the value of the DAI signaling in the DCI format 0/4.

On the basis of the above embodiment, if the terminal does not receive the PDSCH or the PDCCH indicating downlink SPS release in the bundling window and $W_{DAI}^{UL}=4$, then the terminal does not send HARQ-ACK information on the PUSCH, avoiding sending invalid HARQ-ACK information, and thus increasing the efficiency of sending HARQ-ACK information.

In another preferred implementation of the disclosure, when the PUSCH transmission is not based on signaling of the DCI format 0/4, the above terminal determines the number of the downlink subframes according to the uplink and downlink configurations of the serving cells.

As mentioned above, the number of downlink subframes could be determined according to the uplink and downlink configurations of the serving cells: the number of downlink subframes could, but not limited to, be obtained by calculating according to the following formula: $B_c^{DL}=M_c$, wherein $B_c^{DL}$ represents the number of the downlink subframes, and $M_c$ is the number of downlink subframes in the bundling window corresponding to the specified uplink subframe.

On the basis of the above embodiment, if the terminal does not receive the PDSCH or the PDCCH indicating downlink SPS release in the bundling window, then the terminal does not send HARQ-ACK information on the PUSCH, avoiding sending invalid HARQ-ACK information, and thus increasing the efficiency of sending HARQ-ACK information.

In a preferred embodiment of the disclosure, a method for determining the number of encoded modulated symbols required for sending the HARQ-ACK information according to the determined number of downlink subframes is provided. Specifically, the method for determining the number of encoded modulated symbols required for sending the HARQ-ACK information according to the determined number of downlink subframes includes: the terminal determines a bit sequence of the HARQ-ACK information to be sent according to the number of downlink subframes, and determines the number of encoded modulated symbols required for sending the HARQ-ACK information according to the determined bit sequence. By the above processes, the bit sequence of the HARQ-ACK information can be determined according to the determined number of downlink subframes, and thus the number of encoded modulated symbols required for sending the HARQ-ACK information can be determined.

There are various methods for mapping HARQ-ACK information to a bit sequence. In a preferred embodiment of the disclosure, a method for determining a bit sequence of the HARQ-ACK information to be sent according to the number of downlink subframes is provided: a terminal determines the number of bits of the HARQ-ACK information to be sent; and the terminal maps the HARQ-ACK information to be sent to a bit sequence according to the determined number of bits. By the above processes, the HARQ-ACK information to be sent can be mapped to a bit sequence.

On the basis of the above embodiments, the present embodiment provides a specific method for calculating the number of bits, for example, the number of bits N could, but not limited to, be obtained by calculating according to the following formula:

$$N = \sum_{c=0}^{N_{cells}^{DL}-1} (B_c^{DL} \cdot k_c),$$

wherein N represents the number of bits, $N_{cells}^{DL}$ represents the number of configured serving cells, $B_c^{DL}$ represents the number of downlink subframes for the serving cells to feed back the HARQ-ACK information, k represents the maximum of the number of transport blocks supported by a PDSCH corresponding to the downlink transmission of the serving cells. Further, when the maximum number of transport blocks supported by a PDSCH corresponding to the transmission mode is 1, $k_c=1$, and when the maximum number of transport blocks supported by a PDSCH corresponding to the transmission mode is 2, $k_c=2$. In the present embodiment, the number of bits can be determined according to the number of serving cells, the number of transport blocks and the number of downlink subframes, and therefore, when the uplink and downlink configurations are different, invalid HARQ-ACK information will not be sent, which improves the validity of the HARQ-ACK information.

In a preferred implementation of the disclosure, a preferred method for mapping the HARQ-ACK information to be sent to a bit sequence according to the number of bits is provided. Specifically, the method for mapping the HARQ-ACK information to be sent to a bit sequence according to the number of bits includes:

when the number of bits (N) is no greater than 20, a terminal maps the HARQ-ACK information to a bit sequence according to the order of code words first, downlink subframes next, and then serving cells;

when the number of bits (N) is greater than 20, the terminal carries out spatial domain bundling on the HARQ-ACK information, and maps the HARQ-ACK information to a bit sequence according to the order of downlink subframes first, and then serving cells; or the terminal carries out spatial domain bundling on the HARQ-ACK information of serving cells according to the priority of the serving cells, and maps the HARQ-ACK information to a bit sequence according to the order of code words first, downlink subframes next, and then serving cells. In the present embodiment, different methods for mapping HARQ-ACK information to a bit sequence are provided for different numbers of bits, thereby selecting different methods to map HARQ-ACK information to a bit sequence according to different numbers of bits, so as to improve the practicality of the disclosure.

On the basis of the above embodiments, the disclosure provides a preferred method for carrying out spatial domain bundling on the HARQ-ACK information of serving cells according to the priority of the serving cells. Specifically, the method for carrying out spatial domain bundling on the HARQ-ACK information of serving cells according to the priority of the serving cells includes: a terminal determines the priority of the serving cells according to the number of HARQ-ACK information corresponding to uplink and downlink configurations of each serving cell; and carrying out spatial domain bundling on the serving cells one by one according to the priority; or, the terminal determines the priority of the serving cells according to the number of HARQ-ACK information corresponding to uplink and downlink configurations of each serving cell; and carrying out spatial domain bundling on the PDSCHs one by one according to the priority of the serving cells. In the present embodiment, spatial domain bundling could be carried out on the HARQ-ACK information on the serving cells one by one according to the priority of the serving cells, or spatial domain bundling could be carried out on the PDSCHs one by one according to the priority, and different methods could be selected to carry out spatial domain bundling on the HARQ-ACK information according to different needs, improving the flexibility of the disclosure while increasing the efficiency of sending HARQ-ACK information.

It should be noted that, the above embodiments and the preferred embodiments thereof could be applied to the situations of component carrier aggregation of different uplink and downlink configurations.

The above method for sending HARQ-ACK information is described in specific examples below, the method for sending HARQ-ACK information is applicable, but not limited to, the following situation.

Figure 1:
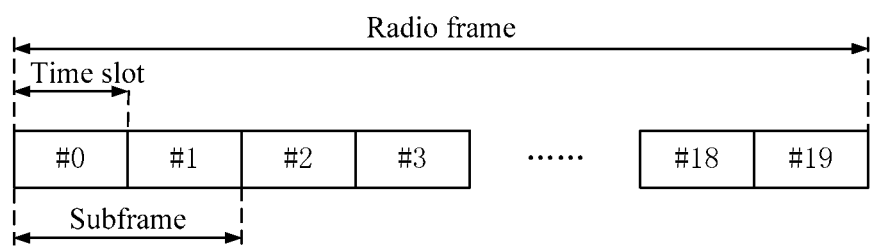
FIG. 1 is a schematic diagram of a frame structure in a FDD system according to relevant technologies.
Figure 2:
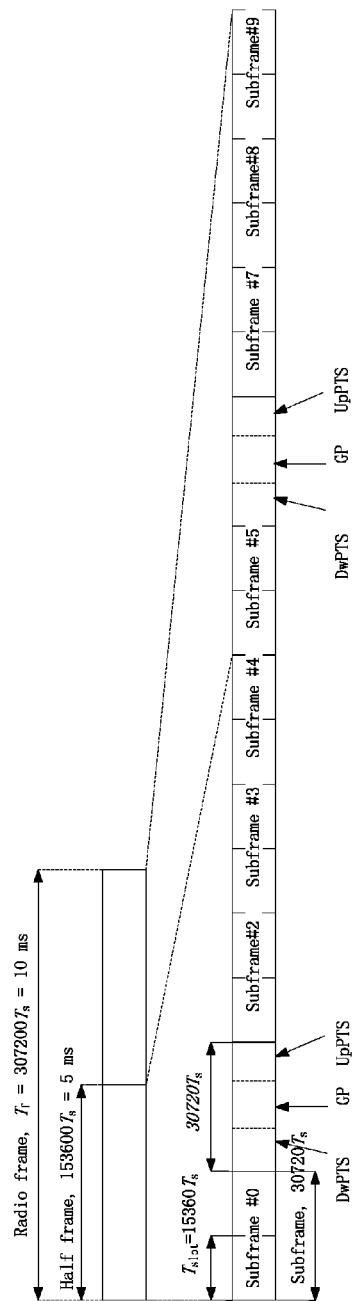
FIG. 2 is a schematic diagram of a frame structure in a TDD system according to relevant technologies.
Figure 3:
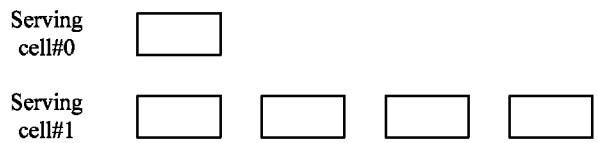
FIG. 3 is a schematic diagram showing the number of downlink subframes of a serving cell under the downlink transmission mode 1 according to relevant technologies.

As shown in FIG. 3, it is assumed that the configuration employs the PUCCH format 3 to transmit HARQ-ACK information and transmission on the PUSCH is needed, PUSCH transmission is performed according to the DCI format 0/4, $W_{DAI}^{UL}=4$, and the downlink transmission mode of the serving cell #0 and the serving cell #1 is 1, that is, the corresponding maximum number of transport blocks supported by the PDSCH is 1, the uplink and downlink configurations of the serving cell #0 is configuration 0, and the uplink and downlink configurations of the serving cell #1 is configuration 2.

The UE determines the number of downlink subframes for the serving cell c to feed back the HARQ-ACK information according to the uplink and downlink configurations of the configured serving cells and the DAI signaling in the DCI format 0/4. For the serving cell #0, the number of downlink subframes in the bundling window is 1, $W_{DAI}^{UL}=4$, then $B_c^{DL}=\min(W_{DAI}^{UL},M_0)=1$, and for the serving cell #1, the number of downlink subframes in the bundling window is 4, $W_{DAI}^{UL}=4$, then $B_1^{DL}=\min(W_{DAI}^{UL},M_1)=4$.

According to the number of downlink subframes for the configured serving cells to feed back the HARQ-ACK information, the UE calculates the number of encoded modulated symbols required for sending the HARQ-ACK information, maps the HARQ-ACK information to the PUSCH of a subframe n, and sends the HARQ-ACK information. Specifically, the UE determines the number of bits $$N = \sum_{c=0}^{1} (B_c^{DL} * 1) = 5$$

of the HARQ-ACK information to be sent according to the number of configured serving cells $N_{cells}^{DL}=2$, the number of downlink subframes $B_c^{DL}$ for which the HARQ-ACK information needs to be fed back by the serving cell c and the transmission mode of the serving cell c, and because N=5<20, the terminal maps the HARQ-ACK information to be sent to a bit sequence of the HARQ-ACK information according to the order of downlink subframes first and serving cells next, and the UE calculates the number of encoded modulated symbols required for sending the bit sequence of the HARQ-ACK information and sends the HARQ-ACK information on the PUSCH.

Further, the above method for sending HARQ-ACK information is described in specific examples below, the method for sending HARQ-ACK information is applicable, but not limited to, the following situation.

Figure 5:
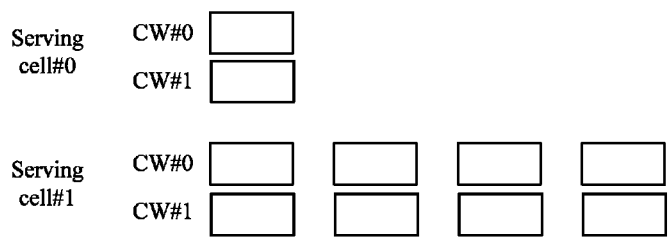
FIG. 5 is a schematic diagram showing the number of downlink subframes of a serving cell under the transmission mode 4 according to an embodiment of the disclosure.

As shown in FIG. 5, it is assumed that the configuration employs the PUCCH format 3 to transmit HARQ-ACK information and transmission on the PUSCH is needed, PUSCH transmission is performed according to the DCI format 0/4, $W_{DAI}^{UL}=4$, and the downlink transmission mode of the serving cell #0 and the serving cell #1 is 4, that is, the corresponding maximum number of transport blocks supported by a PDSCH is 2, the uplink and downlink configurations of the serving cell #0 is configuration 0, and the uplink and downlink configurations of the serving cell #1 is configuration 2.

The UE determines the number of downlink subframes for the serving cell c to feed back the HARQ-ACK information according to the uplink and downlink configurations of the configured serving cells and the DAI signaling in the DCI format 0/4. For the serving cell #0, the number of downlink subframes in the bundling window is 1, $W_{DAI}^{UL}=4$, then $B_0^{DL}=\min(W_{DAI}^{UL},M_0)=1$, and for the serving cell #1, the number of downlink subframes in the bundling window is 4, $W_{DAI}^{UL}=4$, then $B_1^{DL}=\min(W_{DAI}^{UL},M_1)=4$.

According to the number of downlink subframes for the configured serving cells to feed back the HARQ-ACK information, the UE calculates the number of encoded modulated symbols required for sending the HARQ-ACK information, maps the HARQ-ACK information to the PUSCH of a subframe n, and sends the HARQ-ACK information. Specifically, the UE determines the number of bits $$N = \sum_{c=0}^{1} (B_c^{DL} * 2) = 10$$

of the HARQ-ACK information to be sent according to the number of configured serving cells $N_{cells}^{DL}=2$, the number of downlink subframes $B_c^{DL}$ for the serving cell c to feed back the HARQ-ACK information and the transmission mode of the serving cell c, and because N=10<20, the terminal maps the HARQ-ACK information to be sent to a bit sequence of the HARQ-ACK information according to the order of code words first and downlink subframes next and then serving cells, and the UE calculates the number of encoded modulated symbols required for sending the bit sequence of the HARQ-ACK information and sends the HARQ-ACK information on the PUSCH.

On the basis of each of the above preferred embodiments, the present embodiment describes different methods for carrying out spatial domain bundling on the HARQ-ACK information among the above methods for sending HARQ-ACK information by specific examples, and the disclosure is applicable, but not limited to, the following situation.

Figure 6:
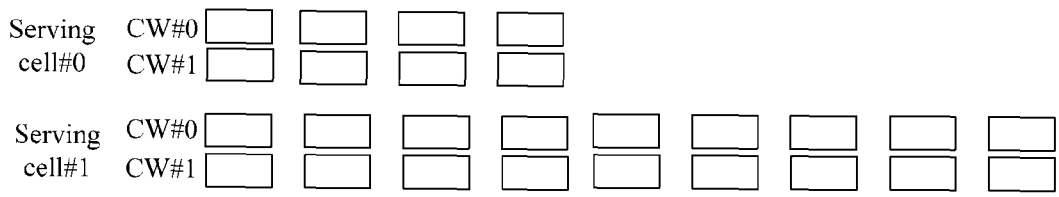
FIG. 6 is another schematic diagram showing the number of downlink subframes of a serving cell under the transmission mode 4 according to an embodiment of the disclosure.
Figure 7:
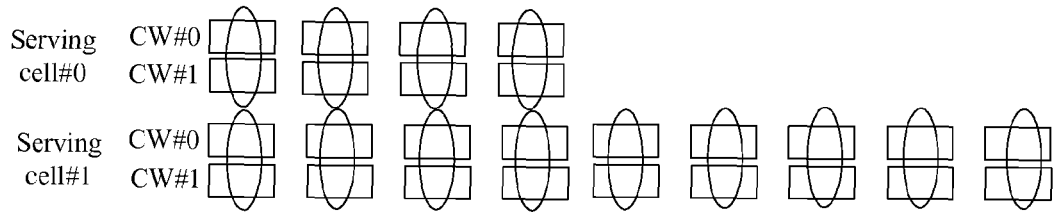
FIG. 7 is a preferred schematic diagram of mapping HARQ-ACK information to a bit sequence according to an embodiment of the disclosure.
Figure 8:
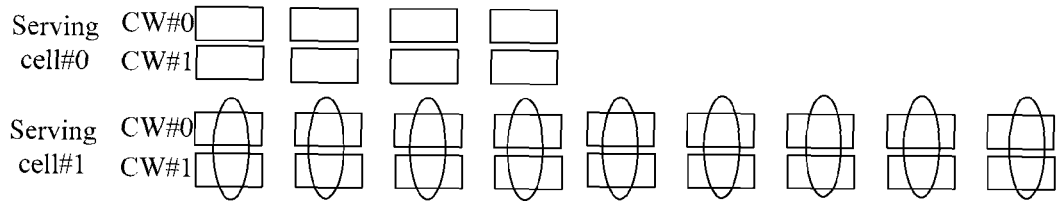
FIG. 8 is a preferred schematic diagram of carrying out spatial domain bundling on the HARQ-ACK information serving cell by serving cell according to an embodiment of the disclosure.
Figure 9:
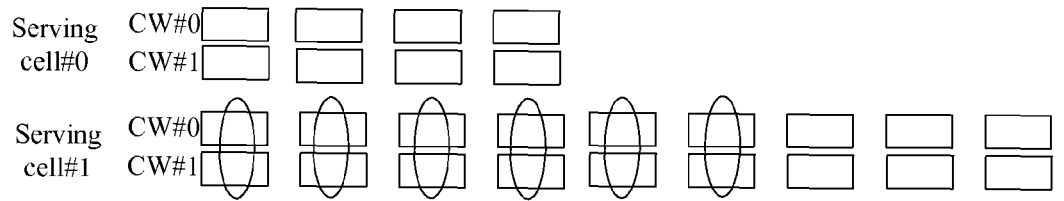
FIG. 9 is a preferred schematic diagram of carrying out spatial domain bundling on the HARQ-ACK information PDSCH by PDSCH according to an embodiment of the disclosure.

As shown in FIG. 6, it is assumed that the configuration employs the PUCCH format 3 to transmit HARQ-ACK information and transmission on the PUSCH is needed, PUSCH transmission is performed according to the DCI format 0/4, $W_{DAI}^{UL}=4$, and the downlink transmission mode of the serving cell #0 and the serving cell #1 is 4, that is, the corresponding maximum number of transport blocks supported by a PDSCH is 2, the uplink and downlink configurations of the serving cell #0 is configuration 2, and the uplink and downlink configurations of the serving cell #1 is configuration 5; the UE determines the number of downlink subframes for the serving cell c to feed back the HARQ-ACK information according to the uplink and downlink configurations of the configured serving cells and the DAI signaling in the DCI format 0/4. For the serving cell #0, the number of downlink subframes in the bundling window is 4, $W_{DAI}^{UL}=4$, and the accumulative number of PDSCHs received by the UE is $U_0=4$, then $B_c^{DL}=\min(W_{DAI}^{UL}, M_0)=4$, and for the serving cell #1, the number of downlink subframes in the bundling window is 9, the accumulative number of PDSCHs received by the UE is $U_0=9$, and $W_{DAI}^{UL}=4$, then U=9 $B_c^{DL}=\min(W_{DAI}^{UL}+4\lfloor(U-W_{DAI}^{UL})/4\rfloor, M_c)=9$. According to the number of downlink subframes for the configured serving cells to feed back the HARQ-ACK information, the UE calculates the number of encoded modulated symbols required for sending the HARQ-ACK information, maps the HARQ-ACK information to the PUSCH of a subframe n, and sends the HARQ-ACK information. Specifically, the UE determines the number of bits $$N = \sum_{c=0}^{1} (B_c^{DL} * k_c) = 26$$

of the HARQ-ACK information to be sent according to the number of configured serving cells $N_{cells}^{DL}=2$, the number of downlink subframes $B_c^{DL}$ for which the HARQ-ACK information needs to be fed back for the serving cell c and the transmission mode of the serving cell c, and because N=22>20, the terminal maps the HARQ-ACK information to be sent to a bit sequence of the HARQ-ACK information after spatial domain bundling according to the order of downlink subframes first, and serving cells next. Or, as shown in FIG. 7, the priority is determined according to the uplink and downlink configurations of the configured serving cells, and spatial domain bundling is carried out, and then the HARQ-ACK is mapped to a bit sequence according to the order of code words first, downlink subframes next, and then serving cells. Since the corresponding number of HARQ-ACKs of the serving cell #1 is maximum, spatial domain bundling is carried out on all of the HARQ-ACK information of the PDSCHs corresponding to two transport blocks on the serving cell #1. Or, as shown in FIG. 8, spatial domain bundling is firstly carried out on the HARQ-ACK information of the PDSCHs corresponding to two transport blocks on the serving cell #1 one by one, until satisfying that the numbers of bits of all of the HARQ-ACK information is less than 20, as shown in FIG. 9.

Embodiment 2

Figure 10:
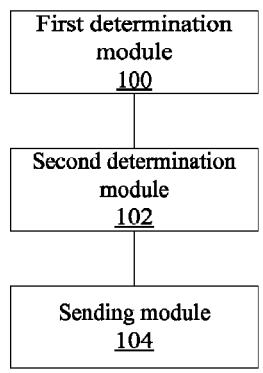
FIG. 10 is a structure diagram of an apparatus for sending HARQ-ACK information according to an embodiment of the disclosure.

On the basis of FIGS. 3-9, the present embodiment provides a preferred apparatus for sending HARQ-ACK information for achieving the above method. The apparatus for sending HARQ-ACK information could be located in a terminal, as shown in FIG. 10, the above apparatus for sending HARQ-ACK information includes:

a first determination module 100, configured to, when a terminal is configured to employ a PUCCH format 3 to transmit HARQ-ACK information and the HARQ-ACK information is transmitted over the PUSCH, determine the number of downlink subframes for serving cells to feed back the HARQ-ACK information;

a second determination module 102, which is in communication connection with the first determination module 100, and configured to determine the number of encoded modulated symbols required for sending the HARQ-ACK information according to the determined number of downlink subframes; and a sending module 104, which is in communication connection with the above second determination module 102, and configured to map the HARQ-ACK information need sending to the PUSCH of a subframe according to the number of encoded modulated symbols determined by the above second determination module 102, and send the HARQ-ACK information.

In the above embodiments, the apparatus can determine the number of downlink subframes, determine the number of encoded modulated symbols required for sending the HARQ-ACK information according to the determined number of downlink subframes, and then map the HARQ-ACK information to the PUSCH of a subframe according to the determined number of encoded modulated symbols needed to send the HARQ-ACK information and send the HARQ-ACK information. By virtue of the present embodiment, HARQ-ACK information can be sent according to the number of downlink subframes, avoiding sending invalid HARQ-ACK information when the uplink and downlink configurations are different, solving the problem that existing HARQ-ACK information transmission way would transmit invalid HARQ-ACK information when the uplink and downlink configurations of serving cells are different in the related techniques, thus increasing the efficiency of sending HARQ-ACK information, improving the performance of HARQ-ACK information, and when the HARQ-ACK information and encoded data are transmitted after being channel interleaved, improving the performance of the data by increasing the efficiency of sending HARQ-ACK information.

Further, the above first determination module 100 is also configured to, when the PUSCH transmission is based on the DCI format 0/4, determine the number of the downlink subframes according to the uplink and downlink configurations of the serving cells and the DAI signaling in the DCI format 0/4, so that the HARQ-ACK information can be sent according to the determined number of downlink subframes to increase the efficiency of HARQ-ACK information.

On the basis of the above embodiments, the above first determination module 100 is also configured to, when the PUSCH transmission is not based on the signaling of the DCI format 0/4, determine the number of the downlink subframes according to the uplink and downlink configurations of the serving cells.

Figure 11:
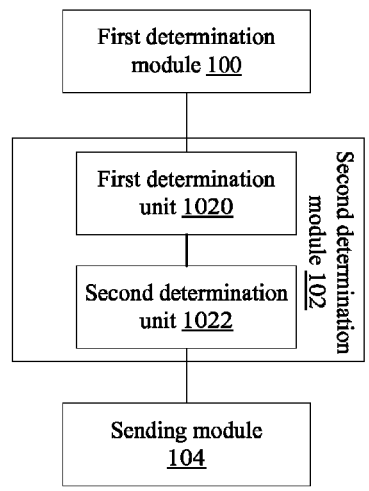
FIG. 11 is a structure diagram of an apparatus for sending HARQ-ACK information according to a preferred embodiment of the disclosure.

On the basis of each of the above preferred embodiments, the above second determination module 102, as shown in FIG. 11, includes: a first determination unit 1020, configured to determine a bit sequence of the HARQ-ACK information according to the number of downlink subframes; a second determination unit 1022, which is in communication with the first determination unit 1020, and configured to determine the number of encoded modulated symbols required for sending the HARQ-ACK information according to the determined bit sequence. In the present embodiment, the bit sequence of the HARQ-ACK information can be determined according to the determined number of downlink subframes, so that the number of encoded modulated symbols required for sending the HARQ-ACK information can be determined, and when the uplink and downlink configurations are different, invalid HARQ-ACK information would not be sent, as a result, the efficiency of sending the HARQ-ACK information can be increased.

In another embodiment, a software is also provided for executing the technical solutions of the above embodiments and preferred implementations.

In another embodiment, a storage medium is also provided with the above software stored therein, and the storage medium includes, but not limited to, an optical disk, floppy disk, hard disk, erasable storage, etc.

Obviously, those skilled in the art should know that each of the mentioned modules or steps of the disclosure can be realized by universal computing devices; the modules or steps can be focused on single computing device, or distributed on the network formed by multiple computing devices; selectively, they can be realized by the program codes which can be executed by the computing device; thereby, the modules or steps can be stored in the storage device and executed by the computing device; and under some circumstances, the shown or described steps can be executed in different orders, or can be independently manufactured as each integrated circuit module, or multiple modules or steps thereof can be manufactured to be single integrated circuit module, thus to be realized. In this way, the disclosure is not restricted to any particular hardware and software combination.

The descriptions above are only the preferable embodiment of the disclosure, which are not used to restrict the disclosure, for those skilled in the art, the disclosure may have various changes and variations. Any amendments, equivalent substitutions, improvements, etc. within the principle of the disclosure are all included in the scope of the protection as defined by the appended claims of the disclosure.

What is claimed is:

1. A method for sending Hybrid Automatic Repeat Request-Acknowledge (HARQ-ACK) information, comprising:

When an HARQ-ACK information configured by a Physical Uplink Control Channel (PUCCH) format 3 is transmitted over a Physical Uplink Shared Channel (PUSCH) by a terminal, the terminal determining the number of downlink subframes for serving cells to feed back the HARQ-ACK information;

the terminal determining the number of encoded modulated symbols required for sending the HARQ-ACK information according to the determined number of the downlink subframes; and the terminal mapping the HARQ-ACK information to be sent to the PUSCH of a specified uplink subframe according to the number of the encoded modulated symbols, and sending the HARQ-ACK information.

2. The method according to claim 1, wherein the terminal determining the number of downlink subframes for the serving cells to feed back the HARQ-ACK information comprises:

when PUSCH transmission is based on a DCI format 0/4, the terminal determining the number of the downlink subframes according to uplink and downlink configurations of the serving cells and DAI signaling in the DCI format 0/4.

3. The method according to claim 2, wherein the terminal determining the number of the downlink subframes according to the uplink and downlink configurations of the serving cells and the DAI signaling in the DCI format 0/4 comprises:

if the uplink and downlink configurations of the serving cells are {1, 2, 3, 4, 6}, then obtaining the number of the downlink subframes by calculating according to the following formula:

$B_c^{DL} = \min(W_{DAI}^{UL}, M_c)$, wherein $B_c^{DL}$ is the number of the downlink subframes, min represents taking a minimum value, $M_c$ is the number of downlink subframes within a bundling window corresponding to the specified uplink subframe, and $W_{DAI}^{UL}$ is the value of the DAI signaling in the DCI format 0/4.

4. The method according to claim 2, wherein the terminal determining the number of the downlink subframes according to the uplink and downlink configurations of the serving cells and the DAI signaling in the DCI format 0/4 comprises:

if the uplink and downlink configurations of the serving cells are {5}, then obtaining the number of the downlink subframes by calculating according to the following formula:

$B_c^{DL} = \min(W_{DAI}^{UL}, M_c)$, wherein $B_c^{DL}$ is the number of the downlink subframes, min represents taking a minimum value, $M_c$ is the number of downlink subframes within a bundling window corresponding to the specified uplink subframe, U is a maximum value of $U_c$ of all serving cells, $U_c$ is an accumulative number of PDCCH indicating SPS release and PDSCH received by the terminal in a bundling window, and $W_{DAI}^{UL}$ is the value of the DAI signaling in the DCI format 0/4.

5. The method according to claim 4, further comprising:

if the terminal does not receive any PDSCH or any PDCCH indicating downlink SPS release in the bundling window of all serving cells and $W_{DAI}^{UL}=4$, then not sending the HARQ-ACK information on the PUSCH.

6. The method according to claim 1, wherein the terminal determining the number of downlink subframes for the serving cells to feed back the HARQ-ACK information comprises:
when PUSCH transmission is not based on signaling of a DCI format 0/4, the terminal determining the number of the downlink subframes according to uplink and downlink configurations of the serving cells.

7. The method according to claim 6, wherein the number of the downlink subframes is obtained by calculating according to the following formula:
$B_c^{DL}=M_c$, wherein $B_c^{DL}$ represents the number of the downlink subframes, and $M_c$ is the number of downlink subframes within a bundling window corresponding to the specified uplink subframe.

8. The method according to claim 7, further comprising:
if the terminal does not receive any PDSCH or any PDCCH indicating downlink SPS release in the bundling window of all serving cells, then not sending the HARQ-ACK information on the PUSCH.

9. The method according to claim 1, wherein the terminal determining the number of the encoded modulated symbols required for sending the HARQ-ACK information according to the determined number of the downlink subframes comprises:
the terminal determining a bit sequence of the HARQ-ACK information to be sent according to the number of the downlink subframes; and
the terminal determining the number of the encoded modulated symbols required for sending the HARQ-ACK information according to the determined bit sequence.

10. The method according to claim 9, wherein the terminal determining the bit sequence of the HARQ-ACK information to be sent according to the number of the downlink subframes comprises:
the terminal determining the number of bits of the HARQ-ACK information to be sent; and
the terminal mapping the HARQ-ACK information to be sent to the bit sequence according to the number of bits.

11. The method according to claim 10, wherein the number of bits is obtained by calculating according to the following formula:

$$N = \sum_{c=0}^{N_{cells}^{DL}-1} (B_c^{DL} \cdot k_c),$$

wherein N represents the number of bits, $N_{cells}^{DL}$ represents the number of configured serving cells, $B_c^{DL}$ represents the number of downlink subframes for the serving cells to feed back the HARQ-ACK information, and $k_c$ represents the maximum of the number of transport blocks supported by a PDSCH corresponding to downlink transmission of the serving cells.

12. The method according to claim 10, wherein the terminal mapping the HARQ-ACK information to be sent to the bit sequence according to the number of bits comprises:
if the number of bits is no greater than 20, then the terminal mapping the HARQ-ACK information to the bit sequence according to an order of code words first, downlink subframes next and then the serving cells.

13. The method according to claim 10, wherein the terminal mapping the HARQ-ACK information to be sent to the bit sequence according to the number of bits comprises:
if the number of bits is greater than 20, then the terminal carrying out spatial domain bundling on the HARQ-ACK information and mapping the HARQ-ACK information to the bit sequence according to an order of the downlink subframes first and then the serving cells.

14. The method according to claim 13, wherein the terminal mapping the HARQ-ACK information to be sent to the bit sequence according to the number of bits comprises:
the terminal carrying out spatial domain bundling on the HARQ-ACK information of the serving cells according to a priority of the serving cells, and mapping the HARQ-ACK information to the bit sequence according to an order of code words first, the downlink subframes next, and then the serving cells.

15. The method according to claim 14, wherein the terminal carrying out the spatial domain bundling on the HARQ-ACK information of the serving cells according to the priority of the serving cells comprises:
the terminal determining the priority of the serving cells according to the corresponding number of the HARQ-ACK information of the uplink and downlink configurations of each of the serving cells; and the terminal carrying out the spatial domain bundling on the serving cells one by one according to the priority of the serving cells.

16. The method according to claim 14, wherein the terminal carrying out the spatial domain bundling on the HARQ-ACK information of the serving cells according to the priority of the serving cells comprises:
the terminal determining the priority of the serving cells according to the corresponding number of the HARQ-ACK information of the uplink and downlink configurations of each of the serving cells; and the terminal carrying out the spatial domain bundling on the PDSCHs one by one according to the priority of the serving cells.

17. A User Equipment (UE), comprising:
a first determination module, configured to, when an HARQ-ACK information configure by a Physical Uplink Control Channel (PUCCH) format 3 is transmitted over a Physical Uplink Shared Channel (PUSCH), determine the number of downlink subframes for serving cells to feed back the HARQ-ACK information;
a second determination module, configured to determine the number of encoded modulated symbols required for sending the HARQ-ACK information according to the determined number of the downlink subframes; and
a sending module, configured to map the HARQ-ACK information to be sent to the PUSCH of a specified uplink subframe according to the number of the encoded modulated symbols, and send the HARQ-ACK information.

18. The UE according to claim 17, wherein the first determination module is further configured to, when PUSCH transmission is based on a DCI format 0/4, determine the number of the downlink subframes according to uplink and downlink configurations of the serving cells and DAI signaling in the DCI format 0/4.

19. The UE according to claim 17, wherein the first determination module is further configured to, when PUSCH transmission is not based on a DCI format 0/4, determine the number of the downlink subframes according to uplink and downlink configurations of the serving cells.

20. The UE according to claim 17, wherein the second determination module comprises:

a first determination unit, configured to determine a bit sequence of the HARQ-ACK information according to the number of the downlink subframes; and a second determination unit, configured to determine the number of the encoded modulated symbols required for sending the HARQ-ACK information according to the determined bit sequence.

\* \* \* \* \*